United States Patent
Hunter

[11] Patent Number: 5,423,576
[45] Date of Patent: Jun. 13, 1995

[54] CORNER PIECES FOR IMPROVED DUCT CONNECTOR

[75] Inventor: A. Reese Hunter, Greensboro, N.C.

[73] Assignee: Industrial Air, Inc., Greensboro, N.C.

[21] Appl. No.: 278,007

[22] Filed: Jul. 20, 1994

Related U.S. Application Data

[63] Continuation-in-part of Ser. No. 818,848, Jan. 10, 1992, Pat. No. 5,356,184.

[51] Int. Cl.$^6$ ............................................. F16L 13/02
[52] U.S. Cl. .................................. 285/286; 285/405; 285/424
[58] Field of Search ............... 285/363, 405, 423, 286

[56] References Cited

U.S. PATENT DOCUMENTS

| | | | |
|---|---|---|---|
| 1,779,346 | 10/1930 | Trachte | 411/918 |
| 1,793,127 | 2/1931 | Osius | 411/918 |
| 1,826,133 | 10/1931 | Hatch | 411/918 |
| 2,332,641 | 10/1943 | Jahant | 285/129 |
| 2,334,046 | 11/1943 | Tinnerman | 411/918 |
| 3,202,184 | 8/1965 | Golshalk | 138/172 |
| 3,387,809 | 6/1968 | Zwerling | 248/58 |
| 3,428,342 | 2/1969 | Chambers. | |
| 3,460,859 | 8/1969 | Keating | 285/319 |
| 3,630,549 | 12/1971 | Grimm | 285/364 |
| 3,712,650 | 12/1973 | Mez | 285/405 |
| 3,791,681 | 2/1974 | Moldow | 285/424 |
| 3,923,326 | 12/1975 | Mez | 285/363 |
| 4,218,079 | 8/1980 | Arnoldt | 285/331 |
| 4,461,499 | 7/1984 | Hunter | 285/364 |
| 4,466,641 | 8/1984 | Hallman et al. | 285/363 |
| 4,552,388 | 11/1985 | Meinig | 285/363 |
| 4,564,227 | 1/1986 | Murck | 285/364 |
| 4,566,724 | 1/1986 | Arnoldt | 285/424 |
| 4,621,661 | 11/1986 | Greiner | 138/172 |
| 5,054,823 | 10/1991 | Arnoldt | 285/363 |
| 5,103,872 | 4/1992 | Jyh-Long | 285/364 |
| 5,133,580 | 7/1992 | Arnoldt | 285/424 |

FOREIGN PATENT DOCUMENTS

| | | | |
|---|---|---|---|
| 036038 | of 1981 | European Pat. Off. | 23/2 |
| 2414815 | of 1975 | Germany | 285/424 |
| 1346366 | of 1974 | United Kingdom | 285/424 |
| 5263 | of 1990 | WIPO | 285/424 |

OTHER PUBLICATIONS

"Ductmate 25", p. 3.
Lockformer/Iowa Precision TDC (Brochure)–Undated.

*Primary Examiner*—Dave W. Arola
*Attorney, Agent, or Firm*—Rhodes, Coats & Bennett

[57] ABSTRACT

A corner piece for a sheet metal connector system that includes coupling members which have a V-shaped cross section and inwardly turned retaining edges spaced a given distance from the apex of the V includes a first leg which has a width slightly less than the given distance and a length, and a second leg which has a width slightly less than the given distance and a length which extends at an angle other than 180 degrees with respect to the first leg's length. The first leg may be snugly fitted between the apex of a first V-shaped coupling member and the inwardly turned edge of the first coupling member and the second leg may be snugly fitted between the apex of a second V-shaped coupling member and the inwardly turned edge of the second coupling member to join the two coupling members together at the angle. The first and second legs may be identical separate pieces which can intersect and be joined.

4 Claims, 5 Drawing Sheets

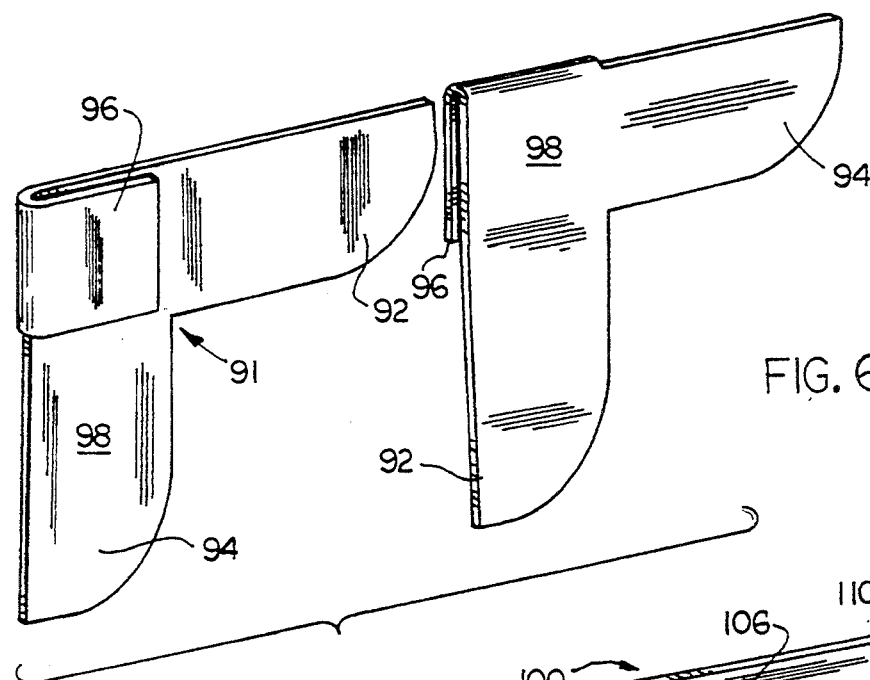
FIG. 6
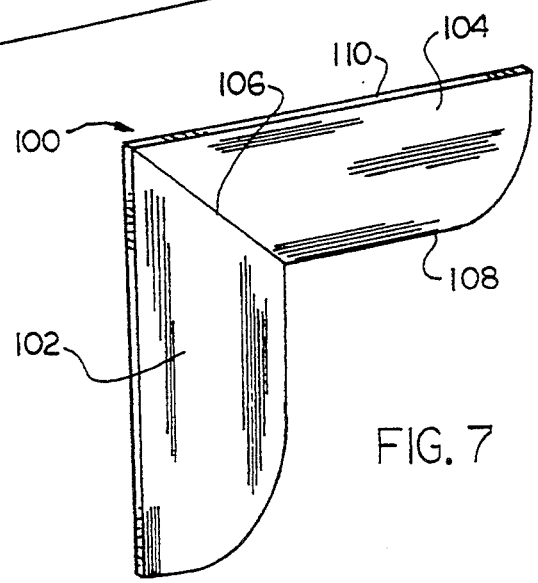
FIG. 7
FIG. 8
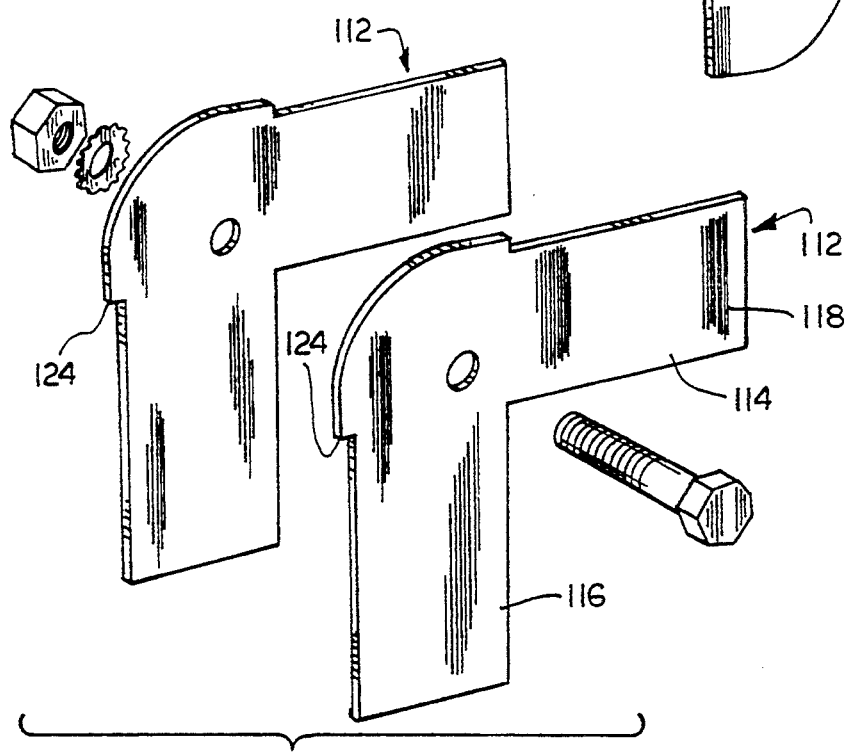

CORNER PIECES FOR IMPROVED DUCT CONNECTOR

This application is a continuation in part of my application Ser. No. 07/818,848 filed Jan. 10, 1992, now U.S. Pat. No. 5,356,184 issued Oct. 18, 1992.

BACKGROUND OF THE INVENTION

The present invention relates to improvements in corner pieces for duct connectors.

In particular, it relates to an improvement in the duct connector disclosed in U.S. Pat. No. 4,461,499 to Hunter et al. entitled "Transverse Joint System for Sheet Metal Ducts", the entire disclosure of which is incorporated herein by reference. That patent is assigned to the assignee of the present application and it depicts a system for connecting sheet metal duct sections. That system has proven to be very useful over the years. It includes abutting sections of sheet metal ducts, joining them at an interface by flanging the ends of each section adjacent the interface and forming a plurality of spaced tabs in the wall surface of the flanges, which tabs protrude outwardly in a direction away from the interface. A generally V-shaped coupling member having a portion of free edges thereof folded back under the corresponding side wall is then assembled over a pair of opposed flanges with the edges of the folded-under portions snapping in behind the tabs to lock the flanges together. Such V-shaped coupling members are arrayed around the periphery of the duct and, at their intersection are interleaved. The coupling members are secured by drilling the interleaved portions and joining them with a nut and bolt arrangement. In an alternative embodiment, the interleaved corners are surrounded by an outer corner piece which is crimped to secure them together.

The coupling members according to the prior patent omit the folded back free edges at their ends so that there is no interference with the interleaving of the intersecting coupling members. Forming the coupling members without the folded free edge at this end and providing the holes through which the bolt is passed is not a problem for those who have the appropriate tools for doing so. In practice the coupling members have had their ends stamped to have the folded edges placed closer to the sides of the V, permitting the interleaving of the sides to form the corners. However, the stamped product still needs to be drilled, and the stamping and drilling apparatus are not widely available. Without having the appropriate tools available, obtaining proper sized coupling members according to the prior invention is difficult, at best.

The present invention is directed toward improving on the prior transverse joint system by providing corner pieces which may be used in connection with V-shaped coupling members according to our prior patent, but not necessitating the use of special tools.

It does so in part by providing a corner member which can be used with a V-shaped coupling member simply cut from a running length of stock material, without other special metal-working tools being needed. Thus, the V-shaped coupling members can be distributed in standard lengths and be cut to suit the needs of particular job without necessitating the use of special tools.

SUMMARY OF THE INVENTION

The present invention provides a corner piece for a sheet metal connector system having coupling members which have a portion with a V-shaped cross section and inwardly turned retaining edges spaced a given distance from the apex of the V. The corner piece has a first leg which has a width slightly less than the given distance and a length. A second leg has a width slightly less than the given distance and a length which extends at an angle other than 180 degrees with respect to the first leg's length. The first leg may be snugly fitted between the apex of a first V-shaped coupling member and the inwardly turned edge of the first coupling member and the second leg may be snugly fitted between the apex of a second V-shaped coupling member and the inwardly turned edge of the second coupling member to join the two coupling members together at the angle.

In some embodiments of the invention, the first and second legs are separate pieces which can intersect and be joined by a connecting pin through their intersected portions to form the angle. Preferably, the first and second legs are identical. Also preferably, two pins are used to join the pieces to help rigidify the joint.

In one embodiment the legs may be formed of a sheet of material bent to form a V-shape having an apex similar to the V-shape of the coupling member. Preferably, the legs have two ends and a portion wider than the given distance, forming a shoulder on an edge of the legs, with the intersecting portion extending from the shoulder to one of the ends. In order to join the separate legs, they have holes therethrough in their intersecting portions. Preferably, the holes are quadrilateral. In a preferred embodiment the other ends of the legs are tapered to facilitate insertion into a coupling member.

In another embodiment the legs are formed of elongated sheets of material bent to form a U-shape with first and second flats aligned to be inserted into the coupling members. Preferably, the legs have two ends, a first of which is where the material is bent, and at least one of the flats has a portion wider than the given distance, forming a shoulder on an edge of the first leg, with the intersecting portion extending from the shoulder to the first end. Again, the legs may be provided with quadrilateral holes in their intersecting portions.

In other embodiments the first and second legs are integral. In one such embodiment the legs each include upper and lower plates which are joined along outer edges and flared apart along inner edges, forming an angle between the plates along each leg comparable to the angle of the V-shape of the coupling members. Preferably, at least one of the plates for each of the legs has a portion wider than the given distance, forming shoulders on edges of the plates, with an intersecting portion extending from the shoulder toward the other of the legs.

In another embodiment the first and second legs extend from an intersection portion and are formed of a single sheet of planar material bent along a line through the intersection portion substantially bisecting the angle between the legs, so that each leg is tilted out of the plane of the periphery of the corner piece. Thus, each leg may be inserted into a coupling member at an angle comparable to the angle of a side of the V-shape of the coupling members.

In another embodiment the sheet of planar material also includes a third leg aligned with one of the first or second legs and extending beyond the other of the first or second legs and sized and shaped similarly to the intersection portion, so that the third leg may be folded over into contact with the intersection portion, for a more uniform appearance.

In another embodiment the first and second legs are formed of upper and lower plates which are joined along outer edges and flared apart along inward edges, forming an angle between the plates along each leg comparable to the angle of the V-shape of the coupling members. The upper and lower plates may have aligned holes therein and be joined by a connecting pin passing through their aligned holes.

In a further embodiment the corner member is formed having two legs which each have a V-shaped configuration with inwardly turned edges spaced from the apex of the V of each leg. Thus, the corner member can be press fit over the outside of the coupling members, with the inwardly turned edges of the corner member snapping under the inwardly turned edges of the coupling member.

The invention also provides a method of joining sheet metal articles having outwardly extending flanges. The method includes the steps of abutting the outwardly extending flanges of sheet metal articles, and affixing coupling members which have V-shaped cross sections and inwardly turned retaining edges spaced a given distance from the apex of the V to the abutted flanges. A corner member is inserted into the coupling member by inserting a first leg which has a length and a width slightly less than the given distance into one coupling member. A second leg which has a length and a width slightly less than the given distance and which has its length extending at an angle other than 180 degrees with respect to the first leg's length is inserted into a second coupling member. Thus, the first leg snugly fits between the apex of the first V-shaped coupling member and the inwardly turned edge of the first coupling member and the second leg snugly fits between the apex of the second V-shaped coupling member and the inwardly turned edge of the second coupling member to join the two coupling members together at the angle. The affixing step follows the abutting step but does not necessarily follow the inserting steps.

In one embodiment in which the first and second legs are separate pieces the method further includes the steps of inserting the first and second legs into the respective first and second coupling members prior to the affixing step, intersecting the legs and joining the legs by inserting a connecting pin through their intersected portions to form the angle. If the legs have quadrilateral holes through their intersecting portions, the joining step further includes aligning the quadrilateral holes and inserting a quadrilateral cross-sectioned connecting pin through the aligned quadrilateral holes. If one of the legs has a portion wider than the given distance to form a shoulder on an edge of the leg, the inserting step includes inserting the leg having the shoulder into its coupling member until the shoulder abuts the coupling member. The joining step may include inserting two pins.

If the legs are formed of bent sheets of material to form side portions, the intersecting step may include interleaving the side portions of one of the legs with the side portions of the other leg. If the legs are formed of elongated sheets of material bent to form a U-shape with a bent portion and first and second flats, the intersecting step may include inserting the bent portion of one of the legs between the flats of the other leg.

In another embodiment the first and second legs are integral and the sheet metal articles to be joined are ducts having four sidewalls, each sidewall having an outwardly extending flange. The abutting step includes abutting two duct portions so that their respective outwardly extending flanges abut to form a peripheral array of abutted flanges. The affixing and inserting steps take place substantially simultaneously and include assembling a frame of coupling members and corner members defining a periphery larger than the periphery of the abutted flanges and progressively compressing the coupling members and corner members onto the outwardly extending flanges of the sidewalls by repeatedly applying inwardly directed forces to the coupling members and corner members.

If the corner member includes a third leg aligned with one of the first or second legs and extending beyond the other of the first or second legs, the method may include folding the third leg over into contact with an intersection portion of the corner member to provide a uniform appearance.

The invention further provides a method of joining sheet metal articles having outwardly extending flanges including the steps of abutting the outwardly extending flanges of sheet metal articles, and affixing coupling members which have a V-shaped cross sections and inwardly turned retaining edges spaced a given distance from the apex of the V to the abutted flanges. Then, the two legs of a corner piece are pressed around the ends of two adjacent, non-aligned coupling members. Since the legs have portions with V-shapes the method includes surrounding the adjacent ends of the coupling members with the legs of the corner member, including snapping an inwardly turned edge of one of the legs of the corner member between the inwardly turned edge of the coupling member and the sheet metal article. Thus, the legs snugly fit around the V-shaped coupling members to join the two coupling members together.

In the embodiments emphasized in this continuation in part application, the invention provides additional styles of corner pieces. According to one embodiment a corner piece for a sheet metal connector system has coupling members which join sheet metal articles that have outwardly extending flanges and which have a portion with a V-shaped cross section and inwardly turned retaining edges spaced a given distance from the apex of the V. The corner piece includes a plate having first and second angled members, each of the angled members having a first leg which has a width slightly less than the given distance and a length, and a second leg which has a width slightly less than the given distance and a length which extends at an angle other than 180 degrees with respect to the first leg's length. The angled members are commonly formed of the plate and joined by connectors along juxtaposed edges of the angled members near the angle between the legs. The angled member can be folded along the connectors and a portion of the first leg of each angled member may be snugly fitted between the apex of a first V-shaped coupling member and an inwardly turned edge of the first coupling member and a portion of the second leg of each angled member may be snugly fitted between the apex of a second V-shaped coupling member and an inwardly turned edge of the second coupling member to join the two coupling members together at the angle. The connector may take the form of tabs extending between the juxtaposed edges. In another embodiment the connector is made up of welds extending between the juxtaposed edges.

In an alternate embodiment the corner piece is made of upper and lower plates, each of which includes a first leg which has a width slightly less than the given distance and a length, and a second leg which has a width slightly less than the given distance and a length which extends at an angle other than 180 degrees with respect to the first leg's length. The upper and lower plates are spot welded along outer edges of an intersection of the legs, so a portion of the first leg of each plate may be snugly fitted between the apex of a first V-shaped coupling member and one of the inwardly turned edges of the first coupling member and a portion of the second leg of each plate may be snugly fitted between the apex of a second V-shaped coupling member and one of the inwardly turned edges of the second coupling member to join the two coupling members together at the angle. The upper and lower plates are preferably flared apart away from the spot welds, forming an angle between the plates along each leg comparable to the angle of the V-shape of the coupling members.

BRIEF DESCRIPTION OF THE DRAWINGS

The invention will be better understood by a reading of the detailed description of the preferred embodiments along with a study of the drawings in which:

FIGS. 2-11 are perspective views of various embodiments of corner pieces according to the present invention.

DETAILED DESCRIPTION OF THE PREFERRED EMBODIMENTS

Figure 1:
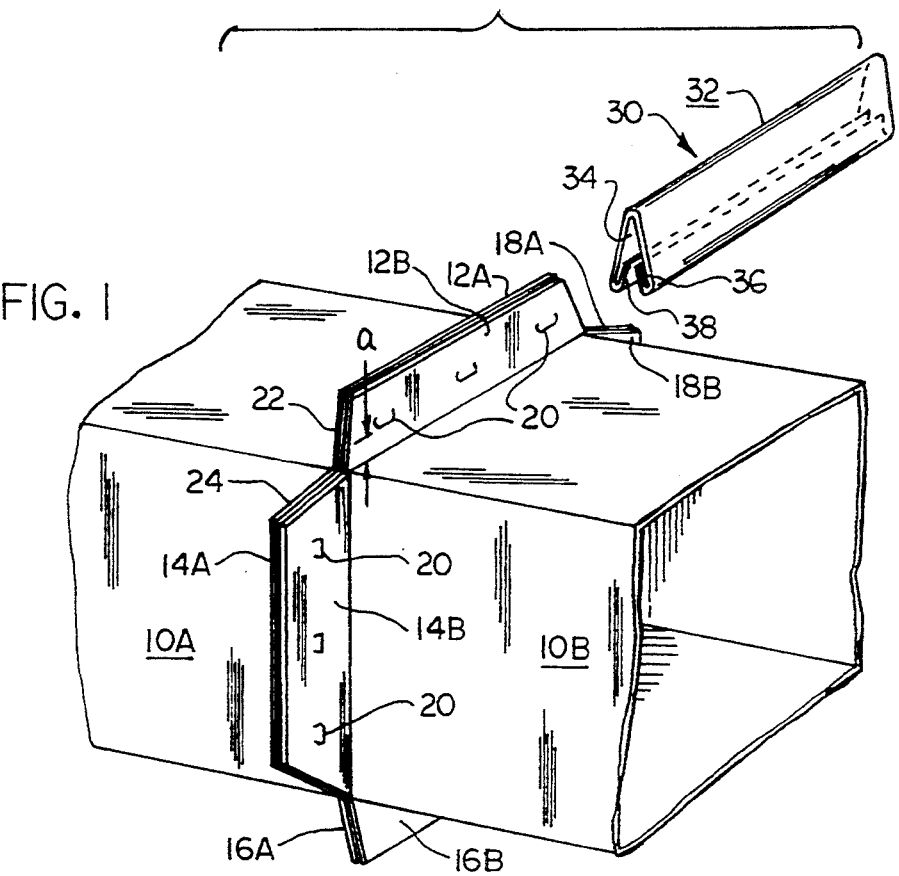
FIG. 1 is a perspective view of a joint connection using the V-shaped coupling member in accordance with the present invention.

As can be seen in FIG. 1, two duct sections 10A and 10B are provided with outwardly extending flanges 12A, 14A, 16A, 18A, 12B, 14B, 16B and 18B. If desired, the flanges may be provided with tabs 20 in accordance with the invention as described in our prior U.S. Pat. No. 4,461,499, mentioned above. A coupling member 30 has a V-shaped cross-section as can be seen in FIG. 1, with side walls extending from an apex 32 down to inwardly turned edges 36, 38. As can be seen in FIG. 1, the edges 36, 38 extend the entire length of the coupling member 30, with the coupling member 30 being cut to size about the same as the length of one of the abutted flange pairs, such as flange pair 12A, 12B. Thus, the coupling member 30 may be pressed over the abutted flanges 12A, 12B to bind them together. Similar coupling members 30 are cut to fit over the other flange pairs 14A, 14B, 16A, 16B, 18A and 18B. The mounting of the coupling members 30 on their abutted flange pairs secures the ducts together. However, the formation of an attractive, stronger and tighter connection is accomplished by use of the improved corner pieces according to the present invention.

Figure 9:
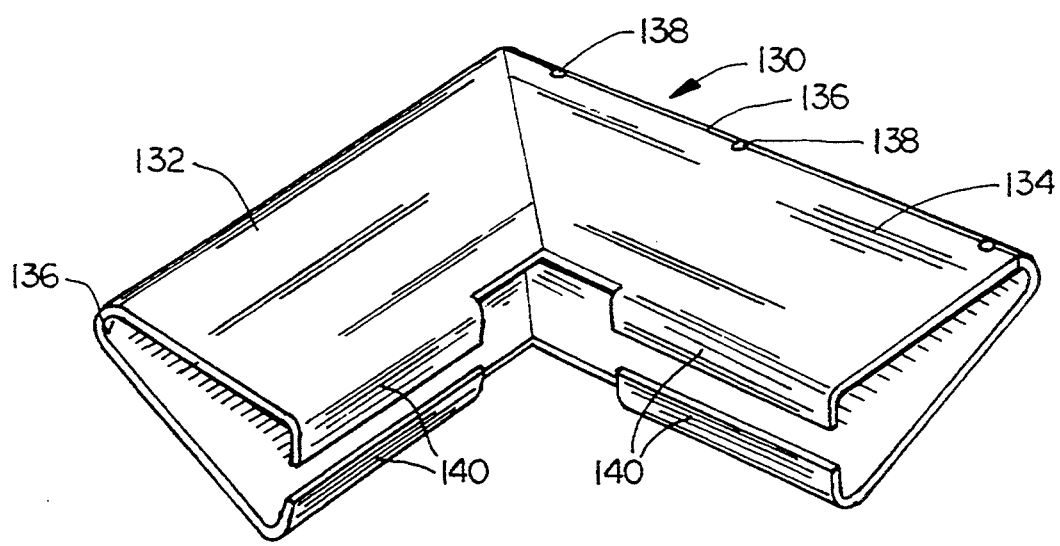

Various embodiments of corner pieces according to the invention are shown in FIGS. 2-9. These are to be considered as being exemplary, but not limiting, of the range of possible corner configurations according to the invention. The corner pieces fall into three groups: one made up of the embodiments of FIGS. 2, 3, and 4; another of the embodiments of FIGS. 5, 6, 7 and 8 and an embodiment as shown in FIG. 9.

Figure 2:
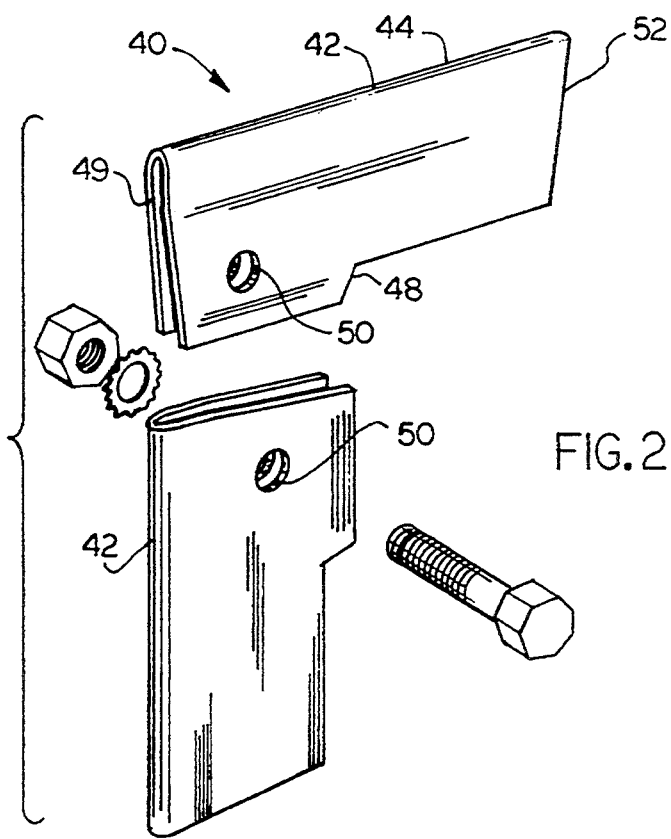
Figure 3:
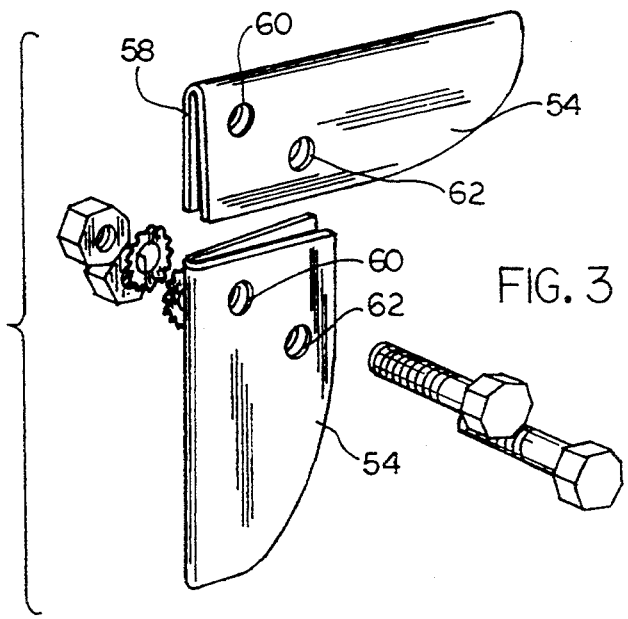
Figure 4:
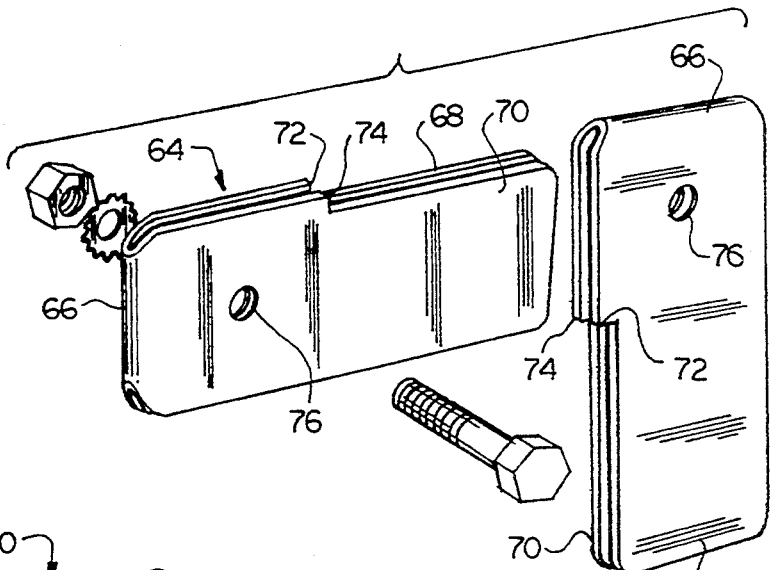

In FIGS. 2, 3 and 4, the corner is made up of two legs, preferably identical to reduce stocking requirements. In FIG. 2, the corner piece 40 is made up of two legs 42. Each leg 42 is made of a folded over sheet of metal, folded to have a V-shape similar to the V-shape of the coupling member 30. The distance from the apex 44 to an edge 46, however, is less than the distance from the apex 32 to the bend forming edges 36, 38 in the coupling member, so that the end 52 of the leg can be inserted into the coupling member. A shoulder 48 begins a portion which is wider to form a stop to prevent excessive insertion of the leg 42 into the coupling member. Also, the two sides of the V are preferably closer together from the shoulder 48 to the end 49 to facilitate interleaving the sides. A hole 50 is provided in the leg situated at a position so that, when two of the legs 42 are enmeshed by interleaving their sides, the holes 50 will align to be able to receive a bolt, lock washer and nut to secure the assembly together. As can be seen, the holes 50 are preferably quadrilateral, such as a square, so that a bolt with a square shaft can be inserted in the holes 50 to prevent rotation of the legs 42 with respect to one another.

Also, as can be seen, the end 52 of the leg is tapered somewhat to facilitate insertion of the leg into the corresponding coupling member. After insertion of the legs 42 in their respective coupling members 30, the coupling members may be mounted on their respective flange pairs, interleaving the sides of the corner members 40 and causing them to intersect. When their holes 50 are aligned as the coupling members are compressed onto the flange pairs, a bolt may be passed through the holes and held in place with a lock washer and a nut. The function of bolts as discussed herein could be provided by self-tapping screws, rivets or any other suitable fastener. If desired, a bead of caulk may be applied to the assembled corner pieces in the region of the shoulders 48 to prevent leaks into or from the ducts 10A, 10B at the joint. The details of the assembly of the other embodiments are similar to those just described for the embodiment of FIG. 2, except as noted.

Another embodiment involving folded over sheet metal and separate legs is seen in FIG. 3. Here, the legs 54 have a reverse taper on their ends 56 from the taper at the end 52 of the embodiment of FIG. 2. Again, the two sides of the V are closer together where they are to intersect than where the legs 54 are inserted into coupling members, to assist in joining the legs. The end 58 is squared off, rather than the truncated shape shown in FIG. 2. Furthermore, in the FIG. 3 embodiment, two holes 60, 62 are provided to receive two bolts and thereby further secure against possible rotation of one leg with respect to the other. If two holes 60, 62 are provided, the desirability of square holes such as hole 50 shown with respect to FIG. 2 is lessened. The use of two holes is presently preferred.

A further embodiment of a leg 64 is shown in FIG. 4. Again, the leg is made of a piece of bent sheet metal, however, here it has a bent end 66 and flats 68, 70 extending therefrom. The flats 68, 70 may be inserted into the coupling member 30, stopping at respective shoulders 72, 74. Again, a hole 76 is provided to receive a bolt to help secure the independent legs together. To install the pieces, the flats are interleaved so that the bent ends of each leg embrace one flat of the other leg.

Figure 5:
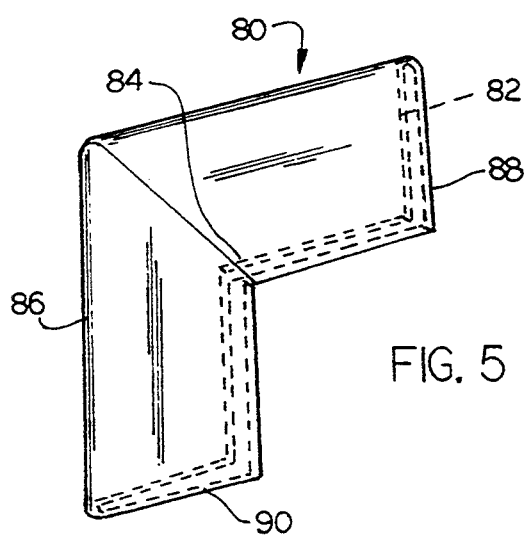

A further embodiment is shown in FIG. 5, in this case, the corner member 80 is formed of two legs which are already joined, such as by welding, brazing or as being formed in that fashion initially. The legs are formed of two plates 82, 84, with the plate 84 only being shown in phantom in FIG. 5. The plates 82, 84 are joined along an outer periphery 86 and flared apart inwardly, forming in each leg 88, 90 a V-shaped cross-section. The V-shape is of a size and shape so that it can be inserted into a coupling member 30.

FIG. 6 illustrates a further one-piece embodiment 91 including a first leg 92, a second leg 94, and a third leg 96. As can be seen, the legs 92, 94 are tapered, similar to the tapering of the legs depicted in FIG. 3, to facilitate insertion into the coupling members 30. However, in the embodiment of FIG. 6, the legs 92, 94, 96 are all formed from a single piece of sheet metal, so that after the legs 92, 94 are inserted into their respective coupling members and the joint is assembled, the leg 96 may be bent over to overlap onto a region 98 of the corner piece to simulate the continuation of the V-shape of the coupling member 30. Preferably, two corner pieces 91 are used, with the leg 92 of one of the corner pieces overlying the leg 94 of the other. Thus, the legs 96 extend out at right angles and can be folded to make four layers of metal in the region 98, approximating the shape of the coupling members 30.

In the embodiment of FIG. 7, the corner piece 100 is made up of a first leg 102 and a second leg 104, again both tapered in a fashion reminiscent of the legs of FIG. 3. The corner piece 100 is formed from a single piece of flat sheet metal with a bend along a line 106, generally bisecting the angle between the two legs 102, 104. This bend 106 causes the inner edge 108 of the legs to be disposed in a plane offset from the plane of the outer edge 110, and therefore facilitates insertion of the corner piece 100 into two corner pieces 30 to complete the corner.

The embodiment of FIG. 8 provides a corner piece 112 which is again assembled from two components but, in this case, each component is an identical plate 114 having a first leg 116, a second leg 118 and a central hole 122. Thus, two of the plates 114 may be assembled by passing a bolt through hole 122. The hole 122 and the bolt may be omitted, if desired. To install the corner, each plate is inserted in one of the sides of the V-shaped portion of two adjacent coupling members 30. Again, the legs are provided with shoulders 124 to limit the extent of insertion of the legs into coupling members.

The embodiment of FIG. 9 approaches corner formation somewhat differently—mounting the corner piece 130 on the outside of the coupling members 30. The corner piece 130 includes legs 132 and 134, typically formed by joining two identical formed sheets along seams 136 with spot welds 138. The legs are formed in a V-shape section, with the width of the sides of the V being slightly greater than the corresponding width of the sides of the coupling members. Ears 140 are formed on the sides turned inwardly, at roughly right angles to the sides of the V. Thus, the corner piece may be pressed over the adjacent coupling members at a corner until the ears 140 snap under the inwardly turned edges 36 and 38 of the coupling members, to a position between the edges 36, 38 and the sidewall of the duct.

The embodiments of FIGS. 5-8, while workable and encompassed within the scope of the invention, are not as desirable as the embodiments of FIGS. 2-4. The embodiments of FIGS. 2-4 make it easier to install the coupling members on the flange pairs. All that is required is the insertion of each leg of a corner piece into a respective coupling member and installation of the coupling members laterally onto the flanges. As one coupling member with its corner piece is installed adjacent another, the corner pieces have their leg portions interleaved (or in the case of the FIG. 4 embodiment, one leg fits inside the other) so that when the coupling members are fully installed, the holes for the nuts and bolts will be aligned to receive the bolt which completes the connection.

With the embodiments of FIGS. 5-8, however, the complete periphery of coupling member and corner units are assembled outwardly of the abutted flanges and then each coupling member is incrementally advanced onto a flange pair with a repeated inward movement of each of the coupling members, so that the respective legs of the corner members will advance into their respective coupling members. While this is a workable system and is deemed to be within the scope of the invention, the process is somewhat more cumbersome, so that the embodiments of FIGS. 2-4 are preferred over the embodiments of FIGS. 5-8. However, the presently most preferred embodiment is that of FIG. 9.

As can be appreciated, the coupling member need only be provided in a stock length, which can be cut off with standard working tools to lengths as needed for the ducts being connected. The completion of the periphery by the use of corner members according to the present invention may easily proceed, since the corner members can also be kept as stock items for use in a multiplicity of possible applications. While the vast majority of applications will entail the use of right angle corner pieces, the corners can be of other angle sizes including 120 degrees for hexagonal ducts and whatever other shape may be desired.

The corner pieces may be used with coupling members of any overall configuration, as long a suitable V-shaped portion is included. Also, the corner pieces can be used with the coupling members in any application suitable for such coupling members.

Figure 10:
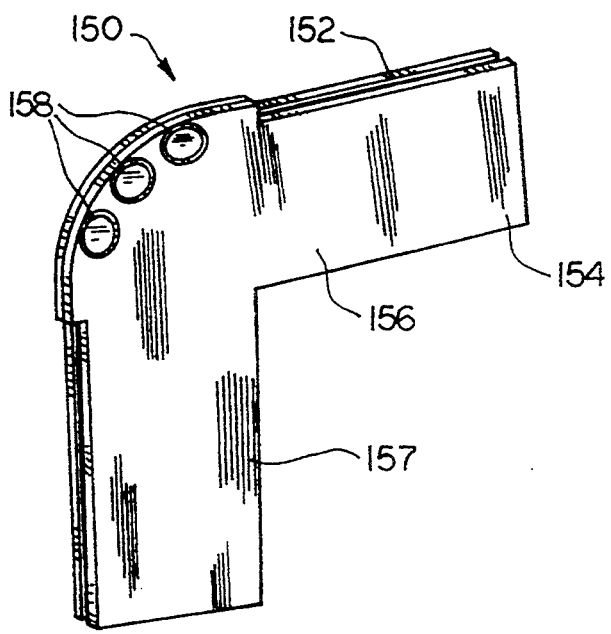

In the embodiment of FIG. 10, the corner piece 150 is made of upper and lower plates 152 and 154. Each plate includes a first leg 156 which has a width slightly less than the given distance and a length and a second leg 157 which has a width slightly less than the given distance and a length which extends at an angle other than 180 degrees with respect to the first leg 156. The legs of the upper plate 152 are not seen in FIG. 10 except for their edges, being hidden by the lower plate 154. The upper and lower plates are spot welded as at 158 along the outer edges of the intersection of the legs. Preferably the plates are flared apart away from the spot welds to form an angle between the plates along each leg comparable to the angle of the V-shape of the coupling members. The spot welding may result in a crinkled edge.

Figure 11:
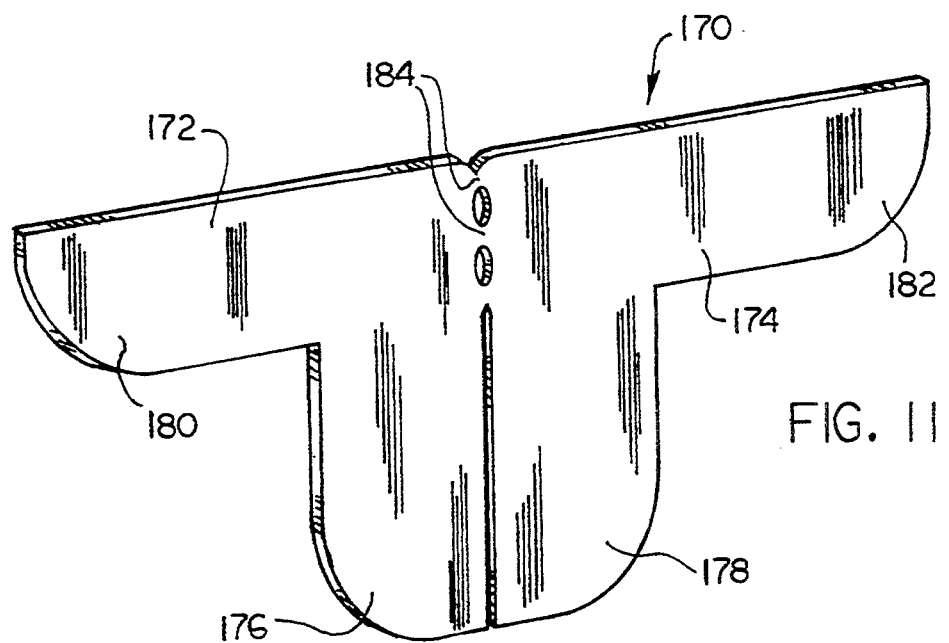

In the embodiment of FIG. 11, the corner piece 170 includes a plate having first and second angled members 172 and 174. Each of the angled members has a first leg 176 and 178, which has a width slightly less than the given distance and a length. Each angled member also has a second leg 180, 182 which has a width slightly less than the given distance and a length which extends at an angle other than 180 degrees with respect to the first leg's length. The angled members are commonly formed of the plate and joined by connectors 184 along juxtaposed edges of the angled members near the angle between the legs. The angled members can be folded along the connectors 184. The connectors 184 may take the form of tabs extending between the juxtaposed edges. In a preferred form, the plate is formed from a unitary plate, stamped to cut it to shape, including cutting voids between the connectors 184 to form the connectors as tabs.

As can be appreciated, the materials of the corner pieces may be stamped or formed in various configurations. In a preferred embodiment, the corners are sheet metal, but other materials could also be substituted.

What is claimed is:

1. A corner piece for a sheet metal connector system having coupling members which join sheet metal articles that have outwardly extending flanges and which have a portion with a V-shaped cross section and inwardly turned retaining edges spaced a given distance from the apex of the V comprising a plate having first and second angled members, each of said angled members having a first leg which has a width slightly less than the given distance and a length, and a second leg which has a width slightly less than the given distance and a length which extends at an angle other than 180 degrees with respect to said first leg's length, said angled members being commonly formed of said plate and being joined by connectors along juxtaposed edges of said angled members near the angle between said legs, said angled member being folded along said connectors, whereby a portion of the first leg of each angled member may be snugly fitted between the apex of a first V-shaped coupling member and an inwardly turned edge of the first coupling member and a portion of the second leg of each angled member may be snugly fitted between the apex of a second V-shaped coupling member and an inwardly turned edge of the second coupling member to join the two coupling members together at said angle.

2. A corner piece as claimed in claim 1 wherein said connector comprises tabs extending between said juxtaposed edges.

3. A corner piece for a sheet metal connector system having coupling members which join sheet metal articles that have outwardly extending flanges and which have a portion with a V-shaped cross section and inwardly turned retaining edges spaced a given distance from the apex of the V comprising first and second plates, each of which includes a first leg which has a width slightly less than the given distance and a length, and a second leg which has a width slightly less than the given distance and a length which extends at an angle other than 180 degrees with respect to said first leg's length, said first and second legs of said first plate intersecting at a first plate intersection and said first and second legs of said second plate intersecting at a second plate intersection, .said intersections having outer edges, said first and second plates being spot welded along said outer edges of said intersections, whereby a portion of the first leg of each plate may be snugly fitted between the apex of a first V-shaped coupling member and one of the inwardly turned edges of the first coupling member and a portion of the second leg of each plate may be snugly fitted between the apex of a second V-shaped coupling member and one of the inwardly turned edges of the second coupling member to join the two coupling members together at said angle.

4. A corner piece as claimed in claim 3 wherein said first and second plates are flared apart away from said spot welds, forming an angle between the plates along each leg comparable to the angle of the V-shape of the coupling members.

* * * * *